United States Patent
Rota et al.

(10) Patent No.: US 10,417,153 B2
(45) Date of Patent: Sep. 17, 2019

(54) VEHICLE SAFETY ELECTRONIC CONTROL SYSTEM

(71) Applicant: VEONEER SWEDEN AB, Vargarda (SE)

(72) Inventors: Alina Rota, Caransebes (RO); Thomas Lundin, Borensberg (SE); Mihai Dragan, Braila (RO)

(73) Assignee: VEONEER SWEDEN AB, Vargarda (SE)

(*) Notice: Subject to any disclaimer, the term of this patent is extended or adjusted under 35 U.S.C. 154(b) by 0 days.

(21) Appl. No.: 15/763,711

(22) PCT Filed: Sep. 29, 2016

(86) PCT No.: PCT/EP2016/073365
§ 371 (c)(1),
(2) Date: Mar. 27, 2018

(87) PCT Pub. No.: WO2017/055513
PCT Pub. Date: Apr. 6, 2017

(65) Prior Publication Data
US 2018/0285296 A1  Oct. 4, 2018

(30) Foreign Application Priority Data
Oct. 2, 2015 (EP) ..................................... 15188252

(51) Int. Cl.
*G06F 13/362* (2006.01)
*G06F 15/17* (2006.01)
(Continued)

(52) U.S. Cl.
CPC .............. *G06F 13/362* (2013.01); *G06F 1/10* (2013.01); *G06F 9/54* (2013.01); *G06F 11/1629* (2013.01);
(Continued)

(58) Field of Classification Search
CPC ..... G06F 11/1641; B60Q 1/447; B60Q 9/008; B60G 2400/104
(Continued)

(56) References Cited

U.S. PATENT DOCUMENTS

| | | | |
|---|---|---|---|
| 5,023,778 A | | 6/1991 | Simon, Jr. et al. |
| 5,053,964 A | * | 10/1991 | Mister ..................... B60L 15/38 |
| | | | 246/187 C |

(Continued)

FOREIGN PATENT DOCUMENTS

| | | |
|---|---|---|
| EP | 0 570 319 A2 | 11/1993 |
| JP | 1994028082 | 2/1994 |

(Continued)

OTHER PUBLICATIONS

International Search Report and Written Opinion dated Nov. 24, 2016.

*Primary Examiner* — Titus Wong
(74) *Attorney, Agent, or Firm* — Brinks Gilson & Lione

(57) ABSTRACT

A vehicle safety electronic control system (8) including a first microcontroller (11), a second microcontroller (12), and an inter-processor communication path (13) for bi-directional transfer of data between the microcontrollers (11,12). The system has a first mode of inter-processor communication in which the first microcontroller (11) acts as a master and the second microcontroller (12) acts as a slave, and a second mode of inter-processor communication in which the second microcontroller (12) acts as a master and the first microcontroller (11) acts as a slave. A mode selector (18-20) is provided to select and switch between the first and second modes.

13 Claims, 1 Drawing Sheet

(51) Int. Cl.
*G06F 11/20* (2006.01)
*G06F 13/00* (2006.01)
*G06F 11/16* (2006.01)
*G06F 1/10* (2006.01)
*G06F 9/54* (2006.01)
*G06F 13/42* (2006.01)
*B60R 16/023* (2006.01)
*B60T 7/12* (2006.01)
*B60W 30/08* (2012.01)
*B60W 30/12* (2006.01)
*B60W 30/14* (2006.01)

(52) U.S. Cl.
CPC ...... *G06F 11/2005* (2013.01); *G06F 11/2028* (2013.01); *G06F 11/2038* (2013.01); *G06F 13/00* (2013.01); *G06F 13/4282* (2013.01); *G06F 15/17* (2013.01); *B60R 16/0231* (2013.01); *B60T 7/12* (2013.01); *B60W 30/08* (2013.01); *B60W 30/12* (2013.01); *B60W 30/14* (2013.01); *G06F 11/202* (2013.01)

(58) Field of Classification Search
USPC .......................................................... 710/110
See application file for complete search history.

(56) References Cited

U.S. PATENT DOCUMENTS

| | | | |
|---|---|---|---|
| 5,475,818 A | 12/1995 | Molyneaux et al. | |
| 5,481,456 A * | 1/1996 | Ogura | B60R 16/0315 477/97 |
| 2003/0101299 A1 | 5/2003 | Kondo et al. | |
| 2004/0153726 A1* | 8/2004 | Suzuki | G06F 13/4291 714/5.1 |
| 2006/0107116 A1* | 5/2006 | Michaelis | G06F 11/0721 714/25 |
| 2009/0027662 A1* | 1/2009 | Rogers | G01B 11/2755 356/139.09 |
| 2015/0338835 A1* | 11/2015 | Holler | G05B 19/058 700/79 |

FOREIGN PATENT DOCUMENTS

| | | |
|---|---|---|
| JP | 1994085874 | 3/1994 |
| JP | 2000-082038 A | 3/2000 |
| JP | 3 369035 B2 | 1/2003 |
| JP | 2013-025570 A | 2/2013 |

* cited by examiner

VEHICLE SAFETY ELECTRONIC CONTROL SYSTEM

CROSS-REFERENCE TO RELATED APPLICATIONS

This application is a 35 U.S.C. § 371 national phase application of PCT International Application No. PCT/EP2016/073365, filed Sep. 29, 2016, which claims the benefit of priority under 35 U.S.C. § 119 to European Patent Application No. 15188252.9, filed Oct. 2, 2015, the contents of which are incorporated herein by reference in their entirety.

FIELD OF THE INVENTION

The present invention relates to an electronic control system, and more particularly relates to a vehicle safety electronic control system.

BACKGROUND

Electronic safety systems are now very widely used in motor vehicles. Suh safety systems may include, for example: blind spot monitoring systems; active cruise control systems; pre-safe braking systems; collision avoidance systems; lane departure prevention systems; and rear-collision mitigation systems.

The complex nature of modern vehicular safety systems places great importance on the performance and reliability of the electronic control systems which are required to provide and manage the safety systems. Such control systems typically include integrated hardware and software in order to host and run so-called Advanced Driver Assistance Systems (ADAS) algorithms.

Such systems are required to satisfy very stringent safety requirements such as the ISO 26262 Functional Safety for Road Vehicles standard, which defines a so-called Automotive Safety Integrity Level (ASIL) risk classification scheme. ASIL-D represents the highest integrity requirements under this standard, and is applicable to safety-related processing tasks.

A requirement of the functional safety standard is that the control system must be capable of identifying safety-relevant errors in its arithmetic, logical and memory units, which is only possible for an ASIL-D electronic control unit if a lockstep processor architecture is used. However, processors with a lockstep architecture of this type have a relatively low processing power which is insufficient to handle modern applications like ADAS with a set of suitable sensors such as Radar, Lidar and/or cameras. It has therefore been proposed to use two microcontrollers, such that a first so-called "safety" microcontroller can handle important safety-related tasks and monitor the operation of a second so-called "performance" microcontroller which has a higher processing power and is thus configured to handle the main processing tasks of the system, under the supervision of the safety microcontroller.

In the type of arrangement described above, the two microcontrollers are required to communicate with one another. The safety microcontroller is usually configured to monitor the performance microcontroller via a high level software flow monitoring approach. In this type of arrangement the safety microcontroller will be able to diagnose problems in the performance microcontroller, providing the communication path between the two microcontrollers is healthy such that the performance microcontroller can communicate with the safety microcontroller. The safety microcontroller may thus be configured to operate as a master microcontroller, and the performance microcontroller may be configured to act as a slave microcontroller. The safety (master) microcontroller thus operates to initiate communication between the two microcontrollers and is generally configured to determine whether or not the communication at any given moment should be in simplex or duplex mode and to clock the transfer of data. As will be appreciated, duplex communication will be necessary when the performance (slave) microcontroller is required to communicate data regarding its state or performance back to the safety (master) microcontroller. Communication between the two microcontrollers is achieved via an Inter-Processor Communication ("IPC") path. The IPC path can take various different forms, with a Serial Peripheral Interface ("SPI") bus being common. In terms of bandwidth, it has been found that at least 100 Mbps of IPC speed are required to operate ADAS functions.

However, it has been found that it can be difficult to achieve sufficient bandwidth for the IPC between microprocessors in prior art arrangements. Furthermore, when using a duplex mode to communicate between microcontrollers it is important that the two microcontrollers are closely matched in terms of frequency in order to permit high-speed communication. This requirement can often mean that a system designer's choice of suitable microprocessors becomes limited, such that the designer cannot select microprocessors solely on the basis of other advantageous technical characteristics, meaning that the designer's ability to create an optimised system becomes compromised. For example, a designer might wish to select two microprocessors from different manufacturers, but doing so can make it very difficult to achieve reliable high-speed duplex communication between them.

It is therefore an object of the present invention to provide an improved vehicle safety electronic control system.

SUMMARY

According to the present invention, there is provided a vehicle safety electronic control system including: a first microcontroller; a second microcontroller; and an inter-processor communication path for the transfer of data between the microcontrollers, the system having: a first simplex mode of inter-processor communication in which the first microcontroller acts as a master and the second microcontroller acts as a slave for the transfer of data from the first microcontroller to the second microcontroller; a second simplex mode of inter-processor communication in which the second microcontroller acts as a master and the first microcontroller acts as a slave for the transfer of data from the second microcontroller to the first microcontroller; and a mode selector configured to select and switch between the first and second modes. The mode selector includes at least two general-purpose input/output connections between the microcontrollers, the general purpose input/output connections being separate from the inter-processor communication path and being configured to handshake the selection of a the communication mode and to synchronise the commencement of data transmission along the inter-processor communication path between the microcontrollers.

Advantageously, the mode selector is configured to select and switch between the first and second modes dynamically.

Conveniently, the mode selector includes a software application on the first microcontroller which is operable to enter the first mode, and a software application on the second microcontroller which is operable to enter the second mode.

Preferably, the system is configured to default to the first mode upon start-up of the system and after each successful transfer of data between the two microcontrollers.

Advantageously, the inter-processor communication path is provided in the form of a synchronous serial communication interface.

Conveniently, the synchronous serial communication interface is a Serial Peripheral Interface (SPI) bus.

Preferably, the system is configured to enable data transfer in each of the first and second communication modes at a rate of at least 100 Mbps.

Advantageously, the maximum data transfer frequency for inter-processor communication in the first mode is different to the maximum data transfer frequency in the second mode.

Conveniently, the maximum data transfer frequency for inter-processor communication in the first mode is less than the maximum data transfer frequency in the second mode.

Preferably, the first microcontroller takes the form of a safety microcontroller, and the second microcontroller takes the form of a performance microcontroller.

Advantageously, the first microcontroller has a lockstep architecture, and the second microcontroller does not.

Conveniently, the first microcontroller is configured to provide a clock function for the transfer of data to the second microcontroller in the first communication mode, and the second microcontroller is configured to provide a clock function for the transfer of data to the first microcontroller in the second communication mode.

Preferably, the first microcontroller has a higher processing power the second microcontroller. The first microcontroller may also have a lockstep configuration.

The control system may be provided in the form of an integrated electronic control unit.

According to a second aspect of the invention, there is provided a motor vehicle electronic safety system having a control system according to the first aspect.

According to another aspect of the present invention, there is provided a vehicle safety electronic control system having: a first microcontroller; a second microcontroller; and an inter-processor communication path for bi-directional transfer of data between the microcontrollers, the system being characterised by having: a first mode of inter-processor communication in which the first microcontroller acts as a master and the second microcontroller acts as a slave; a second mode of inter-processor communication in which the second microcontroller acts as a master and the first microcontroller acts as a slave; and a mode selector configured to select and switch between the first and second modes.

BRIEF DESCRIPTION OF THE DRAWINGS

So that the invention may be more readily understood, and so that further features thereof may be appreciated, embodiments of the invention will now be described by way of example with reference to the accompanying drawings in which.

DETAILED DESCRIPTION

Figure 1:
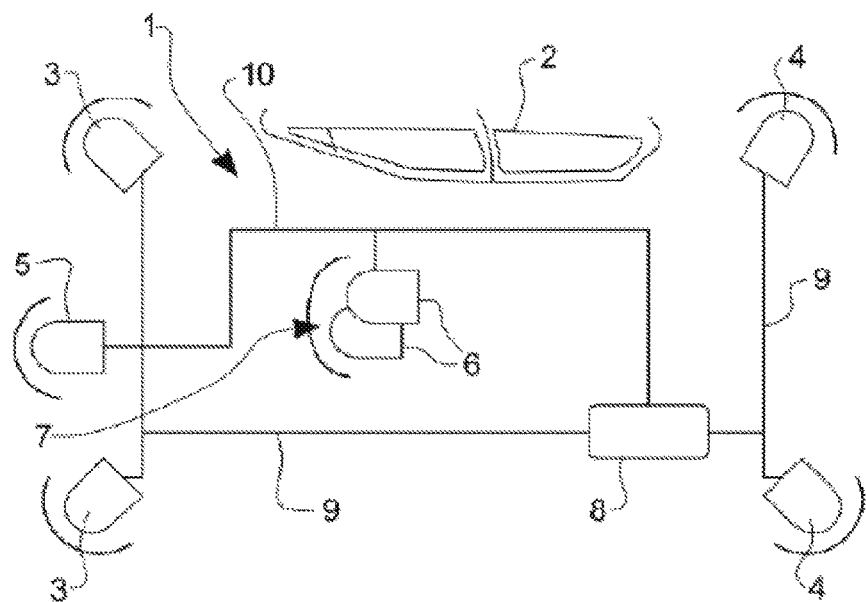
FIG. 1 is a schematic illustration showing an overview of a typical motor vehicle safety system, which may include an electronic control system in accordance with the present invention.

Turning now to consider FIG. 1 in more detail, there is illustrated a schematic representation of an exemplary electronic safety system 1 installed in a motor vehicle 2 (only one side panel of which is denoted in FIG. 1 to indicate the vehicle's orientation). The safety system 1 includes a number of different types of sensor mounted at appropriate positions on the motor vehicle 2. In particular, the system 1 illustrated includes: a pair of divergent and outwardly directed mid-range radar ("MRR") sensors 3 mounted at respective front corners of the vehicle 2, a similar pair of divergent and outwardly directed multi-role radar sensors 4 mounted at respective rear corners of the vehicle, a forwardly directed long-range radar ("LRR") sensor 5 mounted centrally at the front of the vehicle 2, and a pair of generally forwardly directed optical sensors 6 forming part of a stereo vision system ("SVS") 7 which may be mounted, for example, in the region of the upper edge of the vehicle's windscreen. The various sensors 3-6 are operatively connected to a central electronic control system which is typically provided in the form of an integrated electronic control unit 8 mounted at a convenient location within the vehicle. In the particular arrangement illustrated, the front and rear MRR sensors 3, 4 are connected to the central control unit 8 via a conventional Controller Area Network ("CAN") bus 9, and the LRR sensor 5 and the sensors of the SVS 7 are connected to the central control unit 8 via a faster FlexRay serial bus 9, also of a known type.

Collectively, and under the control of the control unit 8, the various sensors 3-6 can be used to provide a variety of different types of driver assistance systems such as, for example: blind spot monitoring; adaptive cruise control; collision prevention assist; lane departure protection; and rear collision mitigation. Accordingly, the control unit 8 will be configured to run appropriate software algorithms for each such driver system.

Figure 2:
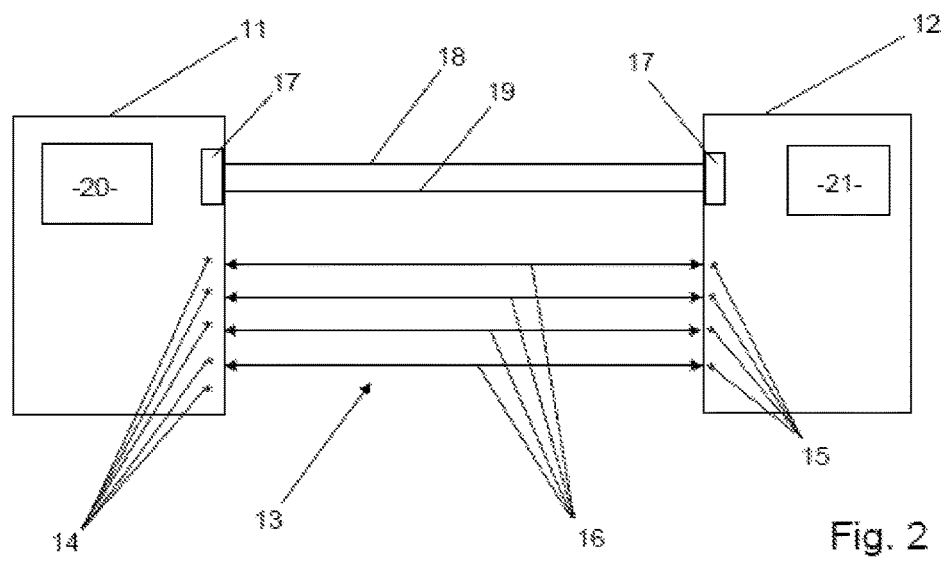
FIG. 2 is a schematic illustration showing an overview the principal hardware elements of an electronic control system in accordance with the present invention.

FIG. 2 illustrates schematically the principal hardware elements of a control system in accordance with the present invention, which it will be appreciated may be provided in the form of the integrated control unit 8 illustrated in FIG. 1. The control system includes a first microcontroller 11, and a second microcontroller 12. The first microcontroller 11 may be configured to run safety software to live up to the strictest (ASIL-D) safety integrity requirements of the system, which require the identification of processing errors, whilst the second microcontroller 12 has a higher processing power and is configured to handle the main processing tasks of the system and some safety-related processing tasks in order to relieve the first microcontroller 11. Because the first microcontroller 11 is configured to satisfy the strict safety integrity requirements of the system it can be considered to represent a so-called "safety microcontroller", and may have a lockstep architecture. Because the second microcontroller 12 is configured to have a higher processing power than the master microcontroller it can be considered to represent a so-called "performance microcontroller", and does not require a lockstep architecture.

In currently preferred embodiments it is envisaged that the first microcontroller 11 may be provided in the form of an Aurix TC29x processor which is commercially available from Infineon Technologies AG, whilst the second microcontroller 12 may be provided in the form of an XC5777X processor which is commercially available from Texas Instruments Inc. It is to be appreciated, however, that other types and brands of processor could be used for either or both the first microcontroller 11 and the second microcontroller 12.

As will be appreciated, the two microcontrollers 11, 12 are required to communicate with one another in a manner which will involve the bi-directional transfer of data, i.e. i) from the first microcontroller 11 to the second microcontroller 12 and vice-versa; ii) from the second microcontroller 12 to the first microcontroller 11. Whilst prior art arrangements are configured to achieve this bi-directional data transfer via duplex communication between the two microcontrollers, with one of the microcontrollers always acting as a master and the other always acting as a slave, the arrangement of the present invention allows all communication between the two microcontrollers 11, 12 to occur in simplex mode.

The two microcontrollers 11, 12 are operatively connected by an Inter-Processor Communication path ("IPC"), which is illustrated schematically at 13 in FIG. 2. The IPC 13 is provided in the form of a synchronous serial communication interface, and in current embodiments may be provided in form of a so-called Serial Peripheral Interface ("SPI") bus.

As will be appreciated, the SPI bus 13 requires four logic signals to permit effective communication between the two microcontrollers 11, 12, namely: SCLK (Serial Clock—output from master); MOSI (Master Output, Slave Input); MISO (Master Input, Slave Output); and SS (Slave Select). Each microcontroller therefore requires at least four SPI modules which are fully compliant to the SPI standard. In the exemplary case of the above-mentioned microcontrollers 11, 12 available from Infineon Technologies AG and Texas Instruments Inc., the first microcontroller 11 has five queued SPI modules (indicated schematically at 14 in FIG. 2), and the second microcontroller 12 has four multi-channel SPI modules (indicated schematically at 15) in FIG. 2. The four SPI modules 15 of the second microcontroller 12 are thus each connected to a respective SPI module 14 of the first microcontroller 11, as illustrated, thereby providing the IPC 13 between the two microcontrollers. The illustrated IPC 13 thus includes four SPI connections 16 between the two microcontrollers 11, 12.

Each microcontroller 11, 12 has manufacturer-defined maximum achievable SPI frequency in duplex and simplex modes. As will be appreciated, the maximum achievable SPI frequency in simplex mode is significantly higher than that in duplex mode for any given microcontroller. Taking the specific example of the first microcontroller 11 being an Aurix TC29x processor and the second microcontroller being an XC5777X processor, then the stated maximum achievable frequencies in simplex mode are 50 MHz and 48 MHz respectively. However, real-world applications give rise to certain electrical characteristics which are dependent on the SPI peripheral internal circuitry of each microcontroller, which thus reduces the actual achievable frequencies down to 25 MHz and 38 MHz in simplex mode for the favoured first and second microcontrollers 11, 12 respectively. Full duplex mode has been found to perform poorly, with maximum achievable frequencies below 15 MHz.

The SPI timings which are known to restrict the maximum achievable frequency are: MOSI data delay; MOSI setup time; MOSI hold time; MISO data delay; MISO setup time: MISO hold time; and clock jitter. These timings are to be considered in an SPI connection of any devices with SPI standard compatible ports, and data integrity is achieved by fully complying with the SPI timings. It is therefore necessary to determine the maximum attainable SPI frequencies.

As indicated above, the arrangement of the present invention achieves all bi-directional data transfer between the two microcontrollers 11, 12 in simplex mode, thereby avoiding the use of duplex mode completely due to its relatively poor performance. This requires dynamic switching between a first simplex communication mode in which the first microcontroller 11 acts as a master and the second microcontroller 12 acts as a slave, and a second simplex communication mode in which the second microcontroller 12 acts as the master and the first microcontroller 11 acts as the slave. The arrangement is configured to select and switch dynamically between these two modes, in order to avoid there being two SPI masters and two SPI slaves at any instant in time. This is achieved via a mode selector, as will be described below.

Each microcontroller 11, 12 includes a plurality of generally conventional General Purpose Inputs and Outputs (GPIOs) 17. At least two of the GPIOs on the first microcontroller 11 are directly connected to respective GPIOs on the second microcontroller 12, thereby defining at least two GPIO connections 18, 19 between the two microcontrollers. These GPIO connections 18, 19 form part of the above-mentioned mode selector. One of the GPIO connections 18 is used to handshake selection of the appropriate communication mode, and thus selection of which microcontroller 11, 12 is to serve as master, and which is to serve as slave for ensuing simplex data transfer between the microcontrollers. The other GPIO connection 19 is used to synchronise the start of data transmission between the microcontrollers. The data transfer itself will occur via the IPC 13 described above.

It is to be appreciated that whilst the invention is described above with reference to an embodiment having two GPIO connections between the two microcontrollers 11, 12, it is envisaged that other embodiments could be provided which have additional GPIO connections between the two microcontrollers 11, 12. Such an arrangement could be used to provide additional functionality. For example, a third GPIO connection (not shown) could be used to trigger a high priority request for a change of communication mode during an ongoing transfer of data between the microcontrollers.

Each microcontroller 11, 12 is configured to run a respective software application, indicated schematically at 20 and 21. The software application 20 on the first microcontroller is configured, amongst other tasks, so as to be operable to select the first simplex communication mode, in which the first microcontroller 11 acts as master and the second microcontroller 12 acts as slave, by transmitting a handshake signal via the first GPIO connection 18 and synchronising, via the second GPIO connection 19, the transmission of data between the two microcontrollers. Similarly, the software application 21 on the second microcontroller 12 is configured, amongst other tasks, to select the second simplex communication mode, in which the second microcontroller 12 acts as master and the first microcontroller 11 acts as slave, by transmitting a handshake signal via the first GPIO connection 18 and synchronising, via the second GPIO connection 19, the transmission of data between the two microcontrollers. The software is configured to determine when either communication mode requires selection on a use-case.

The data to be exchanged between the two microcontrollers 11, 12, in either of the above-described simplex communication modes is split into four data containers and transferred in parallel via respective SPI connections 16 of the IPC 13. A cycle redundancy check will be applied to each data container.

As will therefore be appreciated, the above-described arrangement is configured to transfer data between the two microcontrollers 11, 12 in simplex mode, regardless of whether it is being transferred from the first microcontroller 11 to the second 12, or form the second 12 to the first 11, by dynamically switching between the master/slave modes of each microcontroller 11, 12. Whenever either microcontroller 11, 12 is acting as master, for the transfer of data to the other (slave) microcontroller, it will provide the transfer clock function.

In the case where the two microcontrollers 11, 12 do not have the same achievable data transfer frequencies in simplex mode, the maximum transfer frequency achievable will be greater in one direction than in the other. For example, in the exemplary case of the first microcontroller 11 having a maximum achievable transfer frequency of 25 MHz and the second microcontroller 12 having a higher maximum achievable transfer frequency of 38 MHz, then the maximum line transfer frequency in the first simplex communication mode (i.e. from the first microcontroller 11 to the second 12) will be 25 MHz, and the maximum line transfer frequency in the second simplex mode (i.e. from the second microcontroller 12 to the first 11) will be 38 MHz.

The electronic control system is preferably configured to have a default configuration in which one of the microcontrollers 11, 12 will default to being an SPI master and the other will default to being an SPI slave on start-up of the system and after each successful transfer of data between the microcontrollers.

The electronic control system of the present invention solves the prior art problem of limited bandwidth for the bi-directional transfer of data between two microcontrollers, by permitting data to be transferred in both directions in simplex mode, such that no duplex communication is required. This has been found to permit the configuration of a system in which data can be transferred between the two microcontrollers 11, 12, in either direction, at rates of more than 100 Mbps.

The specified features, steps or integers described in this specification are not intended to be limiting. The described embodiments are not to be interpreted to exclude the presence of other features, steps or integers.

The features disclosed in the foregoing description, including in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A vehicle safety electronic control system comprising:
a first microcontroller;
a second microcontroller;
an inter-processor communication path for the transfer of data between the first and second microcontrollers;
the vehicle safety electronic control system configured for having, a first simplex mode of inter-processor communication in which the first microcontroller acts as a master and the second microcontroller acts as a slave for the transfer of data from the first microcontroller to the second microcontroller;
the vehicle safety electronic control system configured for having, a second simplex mode of inter-processor communication in which the second microcontroller acts as the master and the first microcontroller acts as the slave for the transfer of data from the second microcontroller to the first microcontroller; and
a mode selector configured to select and switch between the first and second modes, the mode selector includes at least two general-purpose input/output connections forming a general-purpose communications path between the first and second microcontrollers; and
the general purpose communications path being physically separate and apart from the inter-processor communication path and being configured to handshake the selection of the inter-processor communication mode and to synchronize the commencement of data transmission along the inter-processor communication path between the first and second microcontrollers.

2. The vehicle safety electronic control system according to claim 1, further comprising, the mode selector is configured to select and switch between the first and second modes dynamically.

3. The vehicle safety electronic control system according to claim 2, further comprising, the mode selector includes a software application on the first microcontroller which is operable to enter the first mode, and a software application on the second microcontroller which is operable to enter the second mode.

4. The vehicle safety electronic control system according to claim 1, configured to default to the first mode upon start-up of the system and after a successful transfer of data between the two microcontrollers.

5. The vehicle safety electronic control system according to claim 1, further comprising, the inter-processor communication path is provided in the form of a synchronous serial communication interface.

6. The vehicle safety electronic control system according to claim 5, further comprising, the synchronous serial communication interface is a Serial Peripheral Interface (SPI) bus.

7. The vehicle safety electronic control system according to claim 1, further comprising, the maximum data transfer frequency for the inter-processor communication in the first mode is different than the maximum data transfer frequency in the second mode.

8. The vehicle safety electronic control system according to claim 7, further comprising, the maximum data transfer frequency for the inter-processor communication in the first mode is less than the maximum data transfer frequency in the second mode.

9. The vehicle safety electronic control system according to claim 1, further comprising, the first microcontroller takes the form of a safety microcontroller, and the second microcontroller takes the form of a performance microcontroller.

10. The vehicle safety electronic control system according to claim 9, further comprising, the first microcontroller has a lockstep architecture, and the second microcontroller does not have a lockstep architecture.

11. The vehicle safety electronic control system according to claim 1, further comprising, the first microcontroller is configured to provide a clock function for the transfer of data to the second microcontroller in the first communication mode, and the second microcontroller is configured to provide a clock function for the transfer of data to the first microcontroller in the second communication mode.

12. The vehicle safety electronic control system according to claim 1, further comprising, the control system is embodied in the form of an integrated electronic control unit.

13. The vehicle safety electronic motor vehicle electronic safety system comprising a control system according to claim 1.

* * * * *